United States Patent
Zheng et al.

(10) Patent No.: US 9,888,496 B1
(45) Date of Patent: Feb. 6, 2018

(54) SYSTEMS AND METHODS FOR CARRIER SENSING IN WIRELESS COMMUNICATION SYSTEMS

(71) Applicant: Marvell International Ltd., Hamilton (BM)

(72) Inventors: Xiayu Zheng, San Jose, CA (US); Hongyuan Zhang, Fremont, CA (US); Ping Gao, Cupertino, CA (US); Sudhir Srinivasa, Campbell, CA (US); Sergey Timofeev, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 199 days.

(21) Appl. No.: 14/821,202

(22) Filed: Aug. 7, 2015

Related U.S. Application Data

(60) Provisional application No. 62/045,383, filed on Sep. 3, 2014.

(51) Int. Cl.
*H04W 74/08* (2009.01)
*H04L 27/26* (2006.01)

(52) U.S. Cl.
CPC ..... *H04W 74/0808* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 7,280,621 | B1* | 10/2007 | Murphy | H04L 27/2662 375/340 |
| 2005/0220229 | A1* | 10/2005 | Goto | H04B 1/7156 375/343 |
| 2006/0093076 | A1* | 5/2006 | Lee | H04L 27/2657 375/343 |
| 2007/0030797 | A1* | 2/2007 | Baek | H04L 27/2675 370/208 |
| 2010/0296611 | A1* | 11/2010 | Maltsev | H04B 1/70757 375/343 |
| 2014/0169488 | A1* | 6/2014 | Varanese | H04L 27/2613 375/260 |

* cited by examiner

*Primary Examiner* — Ayaz Sheikh
*Assistant Examiner* — Tarell Hampton

(57) ABSTRACT

In accordance with embodiments of the present disclosure there is provided a method for carrier sensing. The method includes receiving, at a wireless receiver, an input signal, and generating, based on a sampling period, a plurality of data samples from the input signal. The method further includes periodically combining a first data sample from the plurality of data samples with a second data sample that is one or more sampling periods before the first data sample to generate a combined data sample. The method further includes generating an auto-correlated output for carrier sensing based on the combined data sample. The auto-correlated output is provided to generate an estimate of phase difference between the first sample and the second sample for the periodic combining.

16 Claims, 4 Drawing Sheets

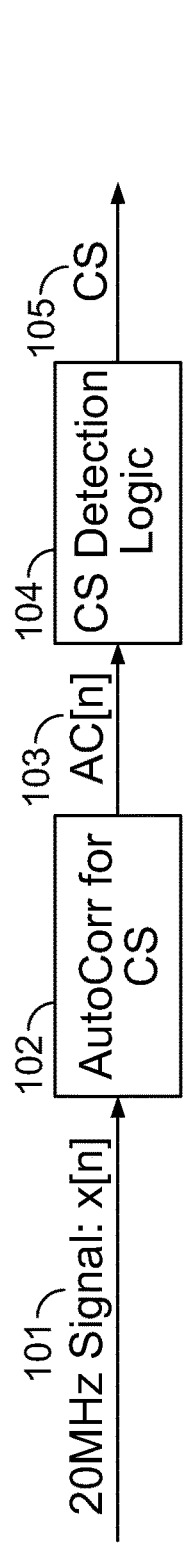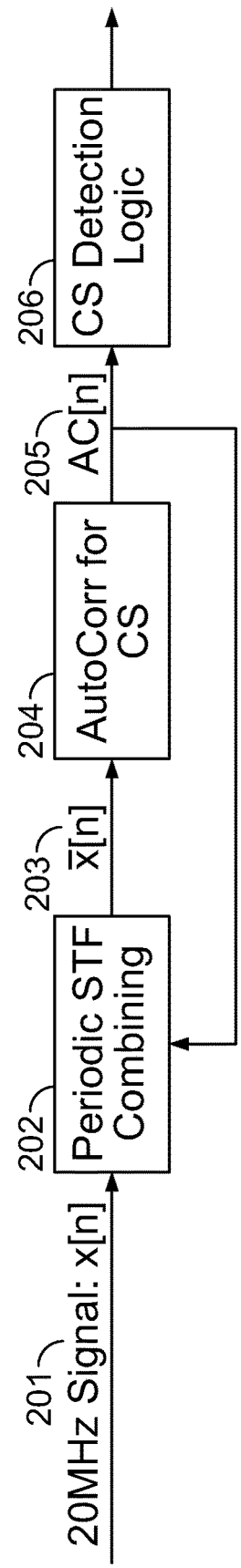

SYSTEMS AND METHODS FOR CARRIER SENSING IN WIRELESS COMMUNICATION SYSTEMS

CROSS-REFERENCE TO RELATED APPLICATION

This disclosure claims the benefit of U.S. Provisional Patent Application No. 62/045,383, filed Sep. 3, 2014, which is hereby incorporated by reference herein in its entirety.

FIELD OF USE

This disclosure relates to a carrier sensing scheme in a wireless data transmission system; for example, a wireless local area network (WLAN) implementing the IEEE 802.11 standard, which can be used to provide wireless transfer of data in outdoor deployments, outdoor-to-indoor communications, and device-to-device (P2P) networks.

BACKGROUND OF THE DISCLOSURE

In a wireless local area network operated under the 802.11a/g/n/ac/ah/ax standards, an orthogonal frequency-division multiplexing (OFDM) scheme is used for digital multi-carrier modulation of signals. The first part of the preamble of each packet transmitted under this OFDM scheme includes a repeated sequence, the short training field (STF). The periodic property of STF can be used in the physical layer carrier sensing (CS) to detect whether a real data packet, instead of channel noise, is received and whether the CS is to be triggered. The packet decoding will only be performed after the carrier sensing is triggered. Therefore, when the channel condition is undesirable with a low signal-to-noise ratio (SNR), it can be difficult to distinguish real data contents from the noise, and, thus, carrier sensing performance may be negatively affected, which may reduce sensitivity of the entire receiver.

SUMMARY

In accordance with embodiments of the present disclosure there is provided a method for carrier sensing. The method includes receiving, at a wireless receiver, an input signal, and generating, based on a sampling period, a plurality of data samples from the input signal. The method further includes periodically combining a first data sample from the plurality of data samples with a second data sample that is one or more sampling periods before the first data sample to generate a combined data sample. The method further includes generating an auto-correlated output for carrier sensing based on the combined data sample. The auto-correlated output is provided to generate an estimate of phase difference between the first sample and the second sample for the periodic combining.

In some implementations, the input signal is modulated under an orthogonal frequency-division multiplexing (OFDM) scheme.

In some implementations, the first data sample includes information relating to a data packet, and a preamble of the data packet includes a repeated sequence.

In some implementations, the periodically combining the first data sample and the second data sample includes calculating a carrier-frequency-offset caused phase difference between two neighboring sampling periods.

In some implementations, the second data sample is phase-shifted by a phase parameter based on the carrier-frequency-offset caused phase difference.

In some implementations, the combined data sample is generated by a weighted average of the first data sample and the second data sample.

In some implementations, the carrier-frequency-offset caused phase difference is estimated based on an average of estimated angles of one or more auto-correlated outputs over a sampling period.

In some implementations, the phase parameter equals the carrier-frequency-offset caused phase difference times a number N, when the second data sample is N sampling periods before the first data sample.

In some implementations, the method further includes generating, via a carrier sensing detection component, a carrier sensing output based on the auto-correlated data sample.

In some implementations, the method further includes periodically combining M consecutive data samples from the plurality of data samples.

In another embodiment of the present disclosure, a system for carrier sensing is disclosed. The system includes a wireless receiver to receive an input signal, and generate, based on a sampling period, a plurality of data samples from the input signal. The system further includes a combining module to periodically combine a first data sample from the plurality of data samples with a second data sample that is one or more sampling periods before the first data sample to generate a combined data sample. The system further includes an autocorrelator to generate, based on the combined data sample, an auto-correlated output for carrier sensing. The auto-correlated output is provided to generate an estimate of phase difference between the first sample and the second sample for the periodic combining.

In some implementations, the system further includes a carrier sensing detection component to generate a carrier sensing output based on the auto-correlated data sample.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 1 provides a block diagram illustrating a conventional carrier sensing mechanism, according to one embodiment.

FIG. 2 provides an example block diagram illustrating a carrier sensing mechanism with periodic STF combining to enhance the SNR of the input signal, according to one embodiment.

DETAILED DESCRIPTION

Figure 3:
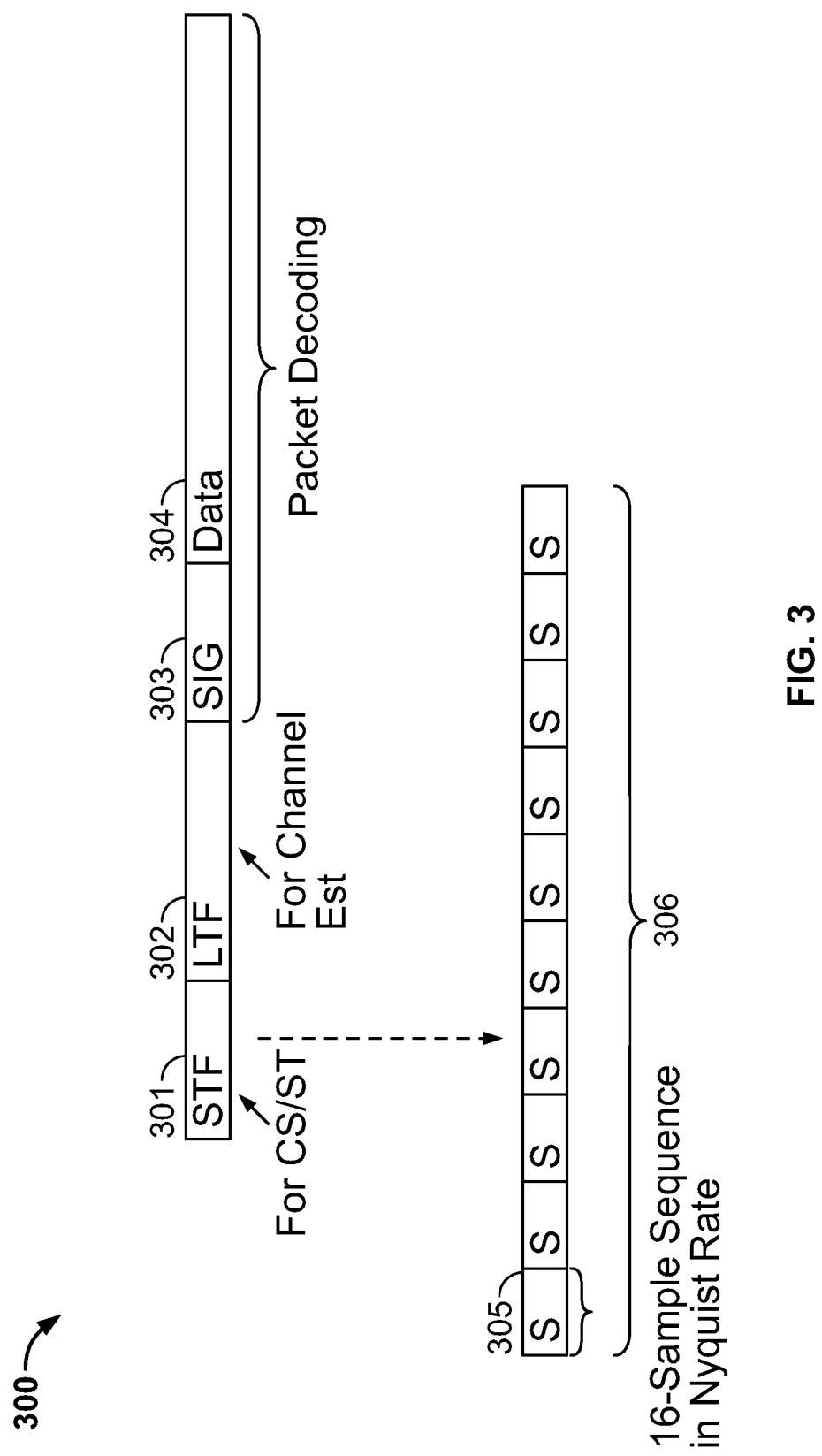
FIG. 3 provides an example block diagram illustrating the data format of the preamble of an OFDM-based WLAN data packet 300 (e.g., under 20 MHz 802.11a), according to one embodiment.

This disclosure describes methods and systems for improving carrier sensing with periodic STF combining in a wireless data transmission system, for example, a WLAN implementing the IEEE 802.11 standard, which can be used to provide wireless transfer of data in outdoor deployments, outdoor-to-indoor communications, and device-to-device (P2P) networks. According to this disclosure, the input signals at a receiver can be periodically combined such that the periodic property of the STF sequence in the preamble of an OFDM-based WLAN data packet can be used to improve SNR of the input channel.

FIG. 1 provides a block diagram illustrating a conventional carrier sensing mechanism. At a wireless receiver, the sampled input signal x[n], e.g., received at 20 MHz, is fed to an autocorrelation module 102. The autocorrelation module 102 performs autocorrelation of the input data sample x[n] 101 based on an integer number of neighboring periods (e.g., the number may be pre-determined and can be dynamically adjusted). The autocorrelation can be conducted directly on the data sample x[n] 101, or on a parameter of the data sample such as the angle or phase of the data sample. For example, a regular autocorrelation performed on data sample x[n] 101 can be performed based on the following or any similar equations:

$$AC[n] = \alpha \cdot \sum_{i=0}^{T-1} x[n-i] \cdot x^*[n-i-T]$$

wherein AC[n] is the output of the autocorrelation module 102; $\alpha$ is a weighing factor, and T is the number of samples in one period depending on sampling rate (e.g., T=16 for Nyquist rate and T=32 for 2× Nyquist, etc.). In another example, an angle-based autocorrelation can be performed based on the following or any similar equations:

$$AC[n] = \alpha \cdot \sum_{i=0}^{T-1} \text{PSK\_MAP}(\theta_x(n-i) - \theta_x(n-i-T))$$

wherein PSK_MAP( ) denotes a function that modulates a signal based on phase-shift keying, and $\theta$ denotes the angle of the data sample x[n] 101.

The autocorrelated data sample AC[n] 103 can then be passed to CS detection logic 104, which decides whether CS should be triggered, e.g., whether a real data packet is received. For example, when the amplitude of the autocorrelated data samples AC[n] 103 rises to a threshold and holds for a pre-defined period, the CS is triggered and the CS signal 105 can be used to enable the further data processing. The threshold and holding period can be chosen to meet a desired probability of false detection rate.

FIG. 2 provides an example block diagram illustrating a carrier-sensing mechanism with periodic STF combining to enhance the SNR of the input signal. In a WLAN system, the advanced error control coding (e.g., MCS10 in 802.11ah), and receiver multi-antenna coherent combining techniques may be adopted to improve the reliability of signal performance and data decoding. These techniques may help the receiver to work with an input signal with a low SNR (e.g., negative SNR in a 1 MHz 802.11ah system). CS, however, does not usually adopt error control coding or coherent combining. As shown in FIG. 2, therefore, a periodic STF combining module 202 is added before the autocorrelator 204 to improve the SNR of the input signal data samples x[n] 201.

The periodic STF combining module 202 can make use of the periodic property of the STF sequence for the combining. In the example, FIG. 3 provides an example block diagram illustrating the data format of the preamble of an OFDM-based WLAN data packet 300 (e.g., under 20 MHz 802.11a). For example, the preamble may include STF 301 for carrier sensing and symbol timing (ST), a long training field (LTF) 302 for channel estimation, and the signal field (SIG) 303 and data field (Data) 304 portions for packet decoding. In the respective example shown in FIG. 3, the STF 301 may have periods of 10 repetitions 306 in the time domain, each of which includes a 16-sample sequence 305 when sampling occurs at the Nyquist rate.

Referring again to FIG. 2, in one implementation, the periodic STF combining module 202 may combine the input data sample x[n] 201 to generate $\bar{x}[n]$ 203 in a procedure based on the following or any similar equations:

$$\bar{x}[n] = \frac{1}{2}(x[n] + x[n-2T] \cdot e^{j2\varphi_n})$$

where $\varphi_n$ is the estimated carrier frequency offset (CFO) caused phase difference between two neighboring periods, and T is the number of samples in one period depending on the sampling rate as defined above. When the current sample is combined with the corresponding sample two periods before, the CFO-caused phase difference needs to be compensated, which is 2 times $\varphi_n$ in this case. $\varphi_n$ can be calculated, for example, based on the output AC[n] 205 of the autocorrelator 204 according to the following:

$$\varphi_n = \frac{1}{L} \sum_{l=1}^{l=L} \angle(AC[n-l])$$

where AC[n] is the autocorrelation result 205 (which can be obtained in a similar manner as 103 in FIG. 1), and L is the number of estimated angles on average (e.g. L=T) to improve estimation accuracy.

In a further implementation, the periodic STF combining module 202 can combine more than two data samples. Separation between the combining samples may depend on the period used for autocorrelation to provide a low probability of false detection. In the above example, data sample x[n] is combined with a data sample two periods before x[n−2T], which can work for a 1-period autocorrelation. When N-period autocorrelation is implemented at the autocorrelator 204, the periodic STF combining is the number of samples in one period depending on sampling rate $$\bar{x}[n] = \frac{1}{M} \sum_{m=0}^{M-1} x[n - 2mN \cdot T] \cdot e^{j2mN\varphi_n}$$

where $\varphi_n$ is the estimated CFO-caused phase difference between two neighboring periods that can be calculated in a similar manner as discussed above, and M denotes a positive integer.

The output $\bar{x}[n]$ 203 from the periodic STF combining module 202 may then be fed to the autocorrelator 204 and CS detection logic 206, which can be operated in a similar manner as 102 and 104 in FIG. 1, respectively.

In an alternative embodiment, the periodic STF combining module 202 can combine the current sample with the corresponding sample one period before. In that case, an estimated CFO-caused phase difference between two neighboring periods is included in the calculation. For example, the combination can be performed based on the following or any similar equations:

$$\bar{x}[n] = \frac{1}{2}(x[n] + x[n-T] \cdot e^{j\varphi_n})$$

where $\varphi_n$ here denotes the CFO-caused phase difference between two neighboring periods, which can be calculated based on the following or any similar equations:

$$\varphi_n = \frac{1}{2L} \sum_{l=1}^{l=L} L(AC[n-l]).$$

In this case, the autocorrelator 204 may accordingly implement 1-period autocorrelation with 2-period separation. For example, the regular autocorrelation can be performed based on the following or any similar equations:

$$AC[n] = \alpha \cdot \sum_{i=0}^{T-1} x[n-i] \cdot x^*[n-i-2T]$$

and an angle-based autocorrelation can be performed based on the following or any similar equations:

$$AC[n] = \alpha \cdot \sum_{i=0}^{T-1} \text{PSK\_MAP}(\theta_x(n-i) - \theta_x(n-i-2T)).$$

Figure 4:
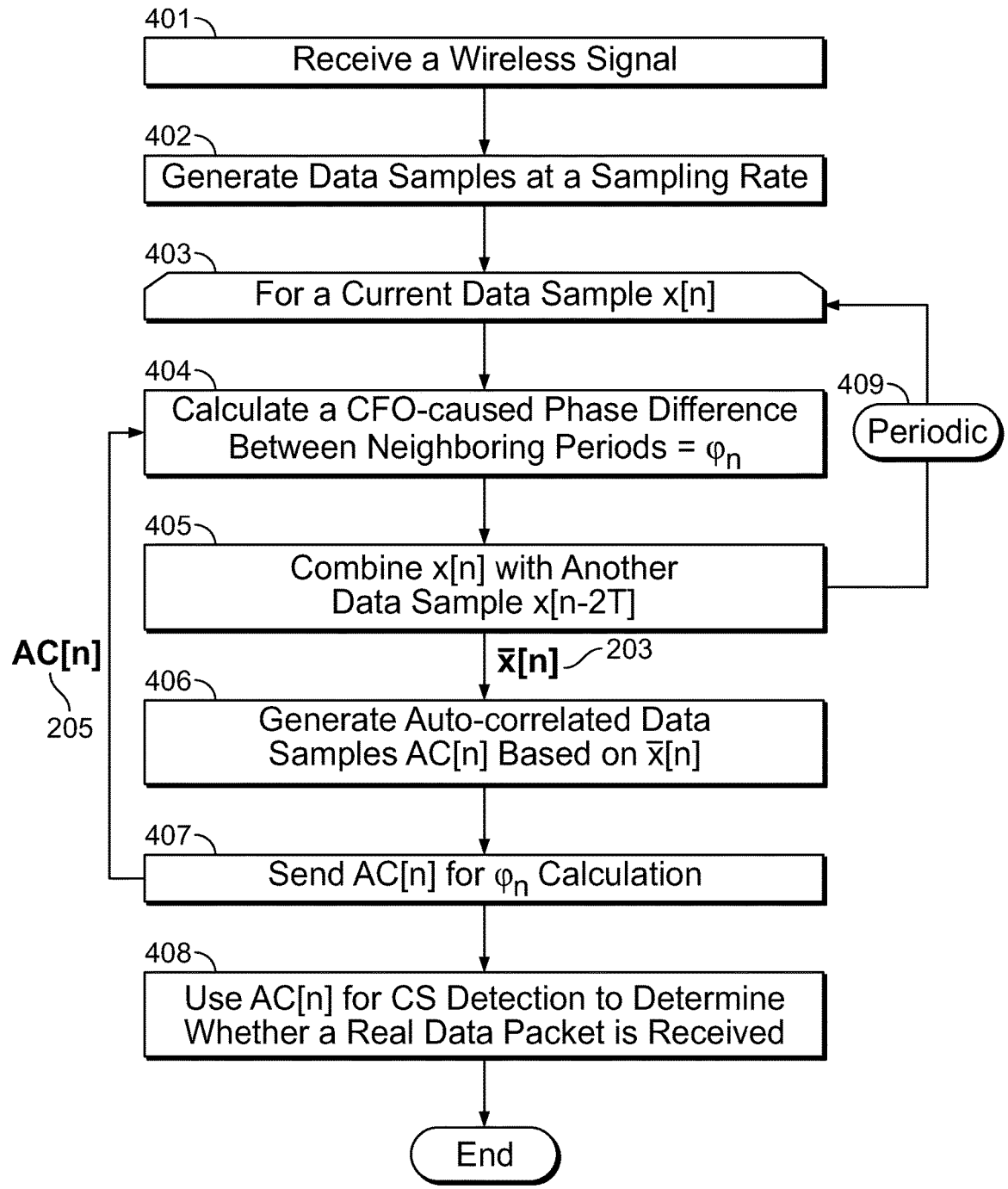
FIG. 4 provides an example logic flow diagram illustrating aspects of pre-CS periodic STC combining at a wireless receiver, according to one embodiment.

FIG. 4 provides an example logic flow diagram illustrating aspects of pre-CS periodic STF combining at a wireless receiver. At 401, a wireless receiver may receive a wireless signal, e.g., from a wireless channel under the 802.11 standards. The wireless receiver may generate data samples at a sampling rate from the received wireless signal, at 402. For a current data sample x[n] (at 403), a CFO-caused phase difference $\varphi_n$ between neighboring periods can be calculated at 404, as discussed in connection with FIG. 2. The calculation of $\varphi_n$ can be based on the output AC[n] 205 from an autocorrelator. At 405, the data samples can be combined, e.g., the current sample to be combined with another data sample two periods before, or one period before. Or alternatively, a number of data samples taken from consecutive periods can be combined, as discussed in connection with FIG. 2. The combination at 405 may be periodically performed (at 409) for each current data sample x[n].

The combined data sample $\bar{x}[n]$ 203 can then be used to generate auto-correlated data samples AC[n] 205 in an autocorrelator, at 406. The auto-correlated data samples AC[n] 205 is then sent for the calculation of $\varphi_n$, at 407. The auto-correlated data samples AC[n] 205 is also used for CS detection to determine whether a real data packet is received, at 408.

Figure 5:
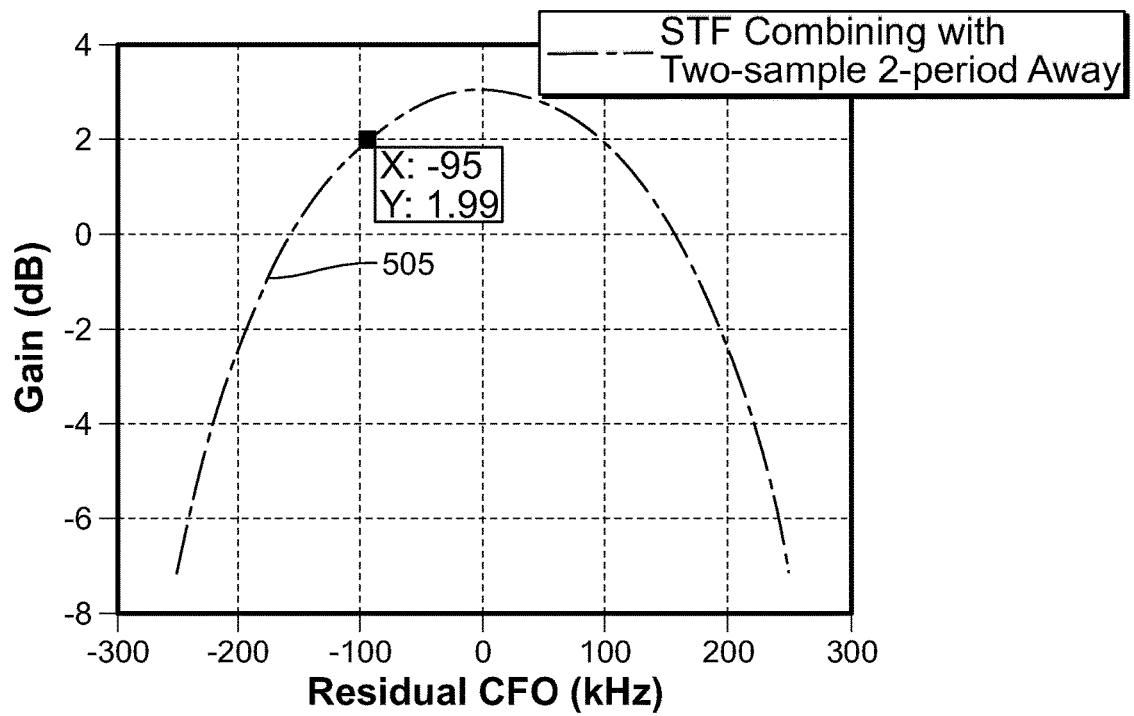
FIGS. 5-6 provide example data performance charts illustrating signal gains after the periodic STF combining, according to one embodiment.
Figure 6:
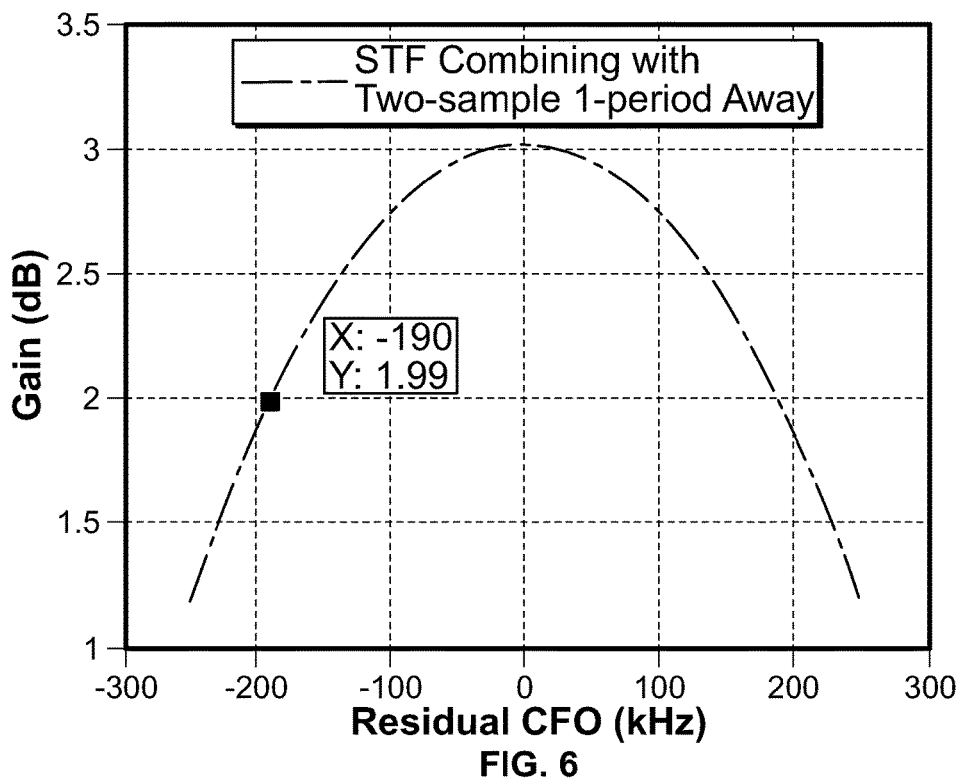

FIGS. 5-6 provide example data performance charts illustrating signal gains after the periodic STF combining. For example, FIG. 5 shows the signal performance with STF combining (gain vs. residual CFO) with two data samples that are two periods away. The data plot 505 shows the effects of CFO on the performance. CFO may introduce a phase difference on the two combined samples, which can result in a small or even negative gain if not compensated when CFO is large. For a low SNR, the CFO estimation may not be accurate although the factor L (as defined above) has been used to estimate the average. As shown in FIG. 5, as long as the residual CFO (after compensation) is within [−95, 95] kHz, at least a 2 dB gain can be realized. At some residual CFO, the periodic STF combining may achieve 3 dB gain. The combining can be extended for more samples (M samples from every two periods) of STF, as long as the whole STF sequence is long enough (e.g., 1 MHz 802.11ah has 4-symbol long or 20 repetitions of STF). The gain from the combining can be as high as 10*log 10 (M).

FIG. 6 shows the signal performance with STF combining with two data samples that are one period away. As shown in FIG. 6, as long as the residual CFO (after compensation) is within [−190, 190] kHz, at least a 2 dB gain can be realized. At some residual CFO, the periodic STF combining may achieve 3 dB gain.

It should be understood that the proposed periodic STF combining scheme is applicable to other wireless systems, e.g., by using the periodic sequences as the preamble for packet detection. For example, the periodic combining can operate in different frequency bands, with different bandwidth, with different periodicity as in STF, with different periods of samples for autocorrelation, with multiple receiver antennas, and/or the like. The autocorrelator output from different antennas can be added to improve the signal SNR and CFO-caused angle difference.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for enhancing a signal-to-noise ratio of received signals to improve carrier sensing performance at a wireless receiver, the method comprising:
   receiving, at a wireless receiver, an input signal;
   generating, based on a sampling period, a plurality of data samples from the input signal;
   calculating a carrier-frequency-offset caused phase difference between two neighboring sampling periods;
   periodically combining a first data sample from the plurality of data samples with a second data sample that is one or more sampling periods before the first data sample and is phase-shifted by a phase parameter based on the carrier-frequency-offset caused phase difference to generate a combined data sample; and generating an auto-correlated output for carrier sensing based on the combined data sample,
   wherein the auto-correlated output is provided to generate an estimate of phase difference between the first sample and the second sample for the periodic combining.

2. The method of claim 1, wherein the input signal is modulated under an orthogonal frequency-division multiplexing (OFDM) scheme.

3. The method of claim 1, wherein the first data sample includes information relating to a data packet, and a preamble of the data packet includes a repeated sequence.

4. The method of claim 1, wherein the combined data sample is generated by a weighted average of the first data sample and the second data sample.

5. The method of claim 1, wherein the carrier-frequency-offset caused phase difference is estimated based on an average of estimated angles of one or more auto-correlated outputs over a sampling period.

6. The method of claim 1, wherein the phase parameter equals the carrier-frequency-offset caused phase difference times a number N, when the second data sample is N sampling periods before the first data sample.

7. The method of claim 1, further comprising:
   generating, via a carrier sensing detection component, a carrier sensing output based on the auto-correlated data sample.

8. The method of claim 1, further comprising:
   periodically combining M consecutive data samples from the plurality of data samples.

9. A system for enhancing a signal-to-noise ratio of received signals to improve carrier sensing performance at a wireless receiver, the system comprising:
   a wireless receiver to receive an input signal, and generate, based on a sampling period, a plurality of data samples from the input signal;
   a combining module to calculate a carrier-frequency-offset caused phase difference between two neighboring sampling periods, and
   periodically combine a first data sample from the plurality of data samples with a second data sample that is one or more sampling periods before the first data sample and is phase-shifted by a phase parameter based on the carrier-frequency-offset caused phase difference to generate a combined data sample; and
   an autocorrelator to generate, based on the combined data sample, an auto-correlated output for carrier sensing,
      wherein the auto-correlated output is provided to generate an estimate of phase difference between the first sample and the second sample for the periodic combining.

10. The system of claim 9, wherein the input signal is modulated under an orthogonal frequency-division multiplexing (OFDM) scheme.

11. The system of claim 9, wherein the first data sample includes information relating to a data packet, and a preamble of the data packet includes a repeated sequence.

12. The system of claim 9, wherein the combined data sample is generated by a weighted average of the first data sample and the second data sample.

13. The system of claim 9, wherein the carrier-frequency-offset caused phase difference is estimated based on an average of estimated angles of one or more auto-correlated outputs over a sampling period.

14. The system of claim 9, wherein the phase parameter equals the carrier-frequency-offset caused phase difference times a number N, when the second data sample is N sampling periods before the first data sample.

15. The system of claim 9, further comprising:
   a carrier sensing detection component to generate a carrier sensing output based on the auto-correlated data sample.

16. The system of claim 9, wherein the combining module periodically combines M consecutive data samples from the plurality of data samples.

* * * * *